United States Patent [19]
Karubian et al.

[11] Patent Number: 5,533,928
[45] Date of Patent: Jul. 9, 1996

[54] ANIMAL HEAD PROCESSING APPARATUS

[75] Inventors: Ralph K. Karubian, Los Angeles, Calif.; Thomas G. Surman, Westpoint, Nebr.

[73] Assignee: Kentmaster Mfg. Co., Inc., Monrovia, Calif.

[21] Appl. No.: 395,418

[22] Filed: Feb. 27, 1995

[51] Int. Cl.⁶ ................................................. A22C 17/04
[52] U.S. Cl. ............................ 452/135; 452/136; 269/24
[58] Field of Search ..................................... 452/135, 136, 452/166, 160; 269/24, 25, 54.1, 126, 140, 237

[56] References Cited

U.S. PATENT DOCUMENTS

| | | | |
|---|---|---|---|
| 4,262,386 | 4/1981 | Saget | 452/135 |
| 4,543,689 | 10/1985 | Couture | 452/135 |
| 4,918,788 | 4/1990 | Passchier | 452/135 |
| 5,372,538 | 12/1994 | Ketels | 452/135 |

FOREIGN PATENT DOCUMENTS

| | | | |
|---|---|---|---|
| 93/20703 | 10/1993 | WIPO | 452/135 |
| 94/02024 | 2/1994 | WIPO | 452/125 |

*Primary Examiner*—Willis Little
*Attorney, Agent, or Firm*—Allan M. Shapiro

[57] ABSTRACT

The apparatus includes two stations in the processing of an animal head in a meat processing line. The first station is for templing where the station has a cup for receiving the jaw and a spindle to engage the skull. Both the spindle and cup are rotatable and are moved toward each other to engage an animal head on the work surface. The spindle and cup rise to raise the head above the work surface for templing both sides of the head without manually lifting the head. The next station holds the head in a jawbone up position. The head is retained by a cup holding the nose and a pin engaging the skull and pushing the nose into the cup. At this station, a power assisted chisel is provided to chisel the meat away from the skull. In addition, a bar engages the lower jaw and, when chiseling is complete, the bar is raised to separate the jaw. The jaw and remaining skull move further along the processing line for separation of the meat and further processing.

20 Claims, 5 Drawing Sheets

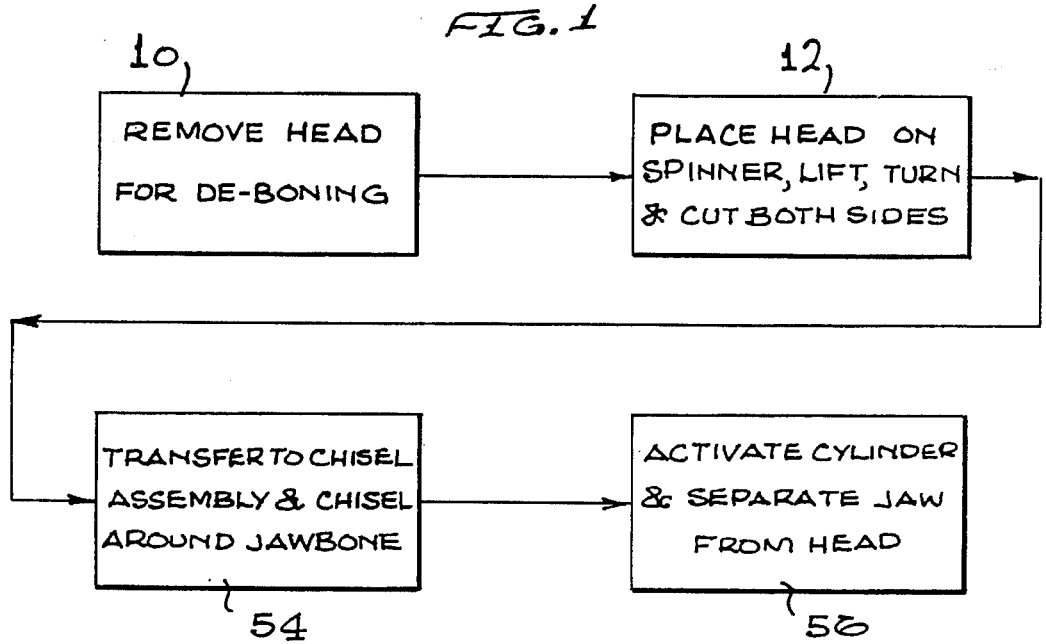
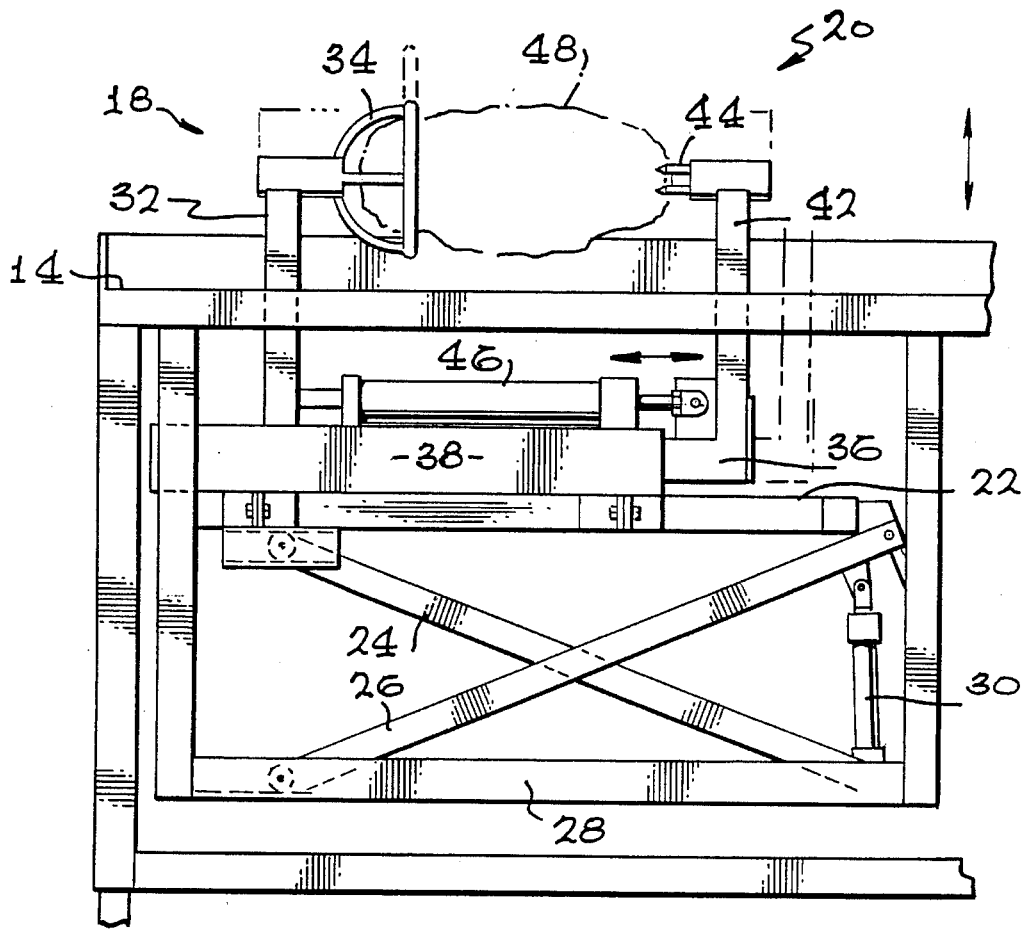

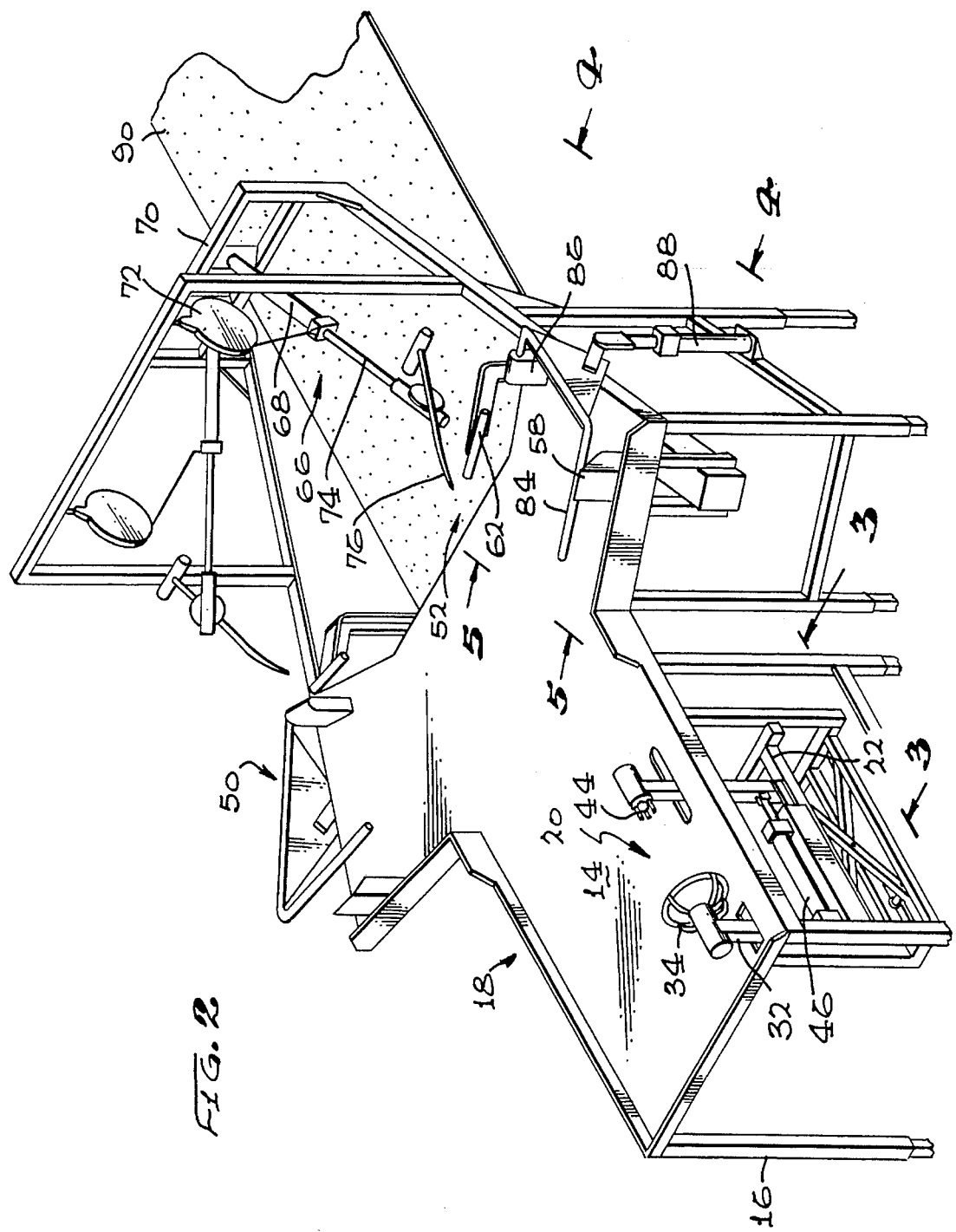

ANIMAL HEAD PROCESSING APPARATUS

FIELD OF THE INVENTION

This invention is directed to an animal head processing apparatus suitable for use in a meat processing plant where repetitive operations are performed on the head of the animal after the head has been removed.

BACKGROUND OF THE INVENTION

During the meat processing operation, the animal is slaughtered after which the head of the animal is removed for inspection by the United States Department of Agriculture. After inspection, the meat is removed from the head by deboning. The deboning procedure is done in steps. First, cuts are made in the side of the head at the temple thereof to cut the meat away from the head. The person doing this job is referred to as "the templer."

At most plants, the templer must lift the head and turn it to cut both sides of the head. The need to lift the head, which weighs 30 to 40 pounds, and make the cuts puts a tremendous amount of stress on the templer's hands and wrists. In the usual meat processing line, the next step is to force the meat from the sides of the jawbone. A pointed chisel is placed at the base of the jawbone joint and moved back and forth to force the meat from the bone. The continuous repeated arm and hand movement of this job also puts a great deal of stress on the worker's hands and wrists. Now the jawbone can be removed. This is presently usually done by lifting the head onto a saddle-like device. In that position, a wheel with spikes on it separates the jaw from the head. The worker must lift the head into place and then remove the separated jaw and head. This worker is also exposed to hand and wrist stress from the lifting of the head. Workers who regularly perform such jobs often suffer from repetitive stress syndrome and, thus, it is desirable to provide apparatus which overcome the need for lifting the animal heads during processing.

SUMMARY OF THE INVENTION

In order to understand this invention, it can be stated in essentially summary form that it is directed to an animal head processing apparatus which has one or more work stations equipped so as to overcome the need for lifting animal heads into processing position. A first station may engage the jaw and skull end of the head to raise the head from the work surface, and these engagement devices are rotatable so that the head supported thereby can be rotated to the proper position for work thereon. The processing apparatus may also include a station wherein the head is held between a nose cup and a holder while a chisel is manually positioned to separate the meat from the bone. This station may also engage the jaw and rotate the jaw to break the jaw loose once the meat is separated.

It is thus a purpose and advantage of this invention to provide an animal head processing apparatus which reduces the amount of strain from the number of repetitive actions that a worker must perform with his arms and hands in order to reduce the chance of a repetitive stress disorder.

It is a further purpose and advantage of this invention to provide an animal head processing apparatus which engages, lifts and permits rotation of an animal head on a processing line in order to permit the worker to make cuts or perform other actions on the animal head without the need for the worker to raise the head off of the work surface or turn the head on the work surface.

It is a further purpose and advantage of this invention to provide an animal head processing apparatus which holds the head in place on the work surface during chiseling of the meat off of the head so that the worker need not restrain the head at the same time he is attempting to remove meat therefrom.

It is a further purpose and advantage of this invention to provide an animal head processing apparatus for use in a meat processing line wherein power is used to remove the jaw from the skull while the skull is being restrained so that the worker need not use physical strength to accomplish this step.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a process block diagram showing the steps accomplished on a meat processing line at which the present apparatus is useful.

FIG. 2 is a perspective view of a position on the meat processing line wherein an animal head is successively positioned for templing and for chiseling and jaw removal.

FIG. 3 is an enlarged elevational view of the portion of the processing apparatus directed to the templing station, as seen generally along line 3—3 of FIG. 2.

DESCRIPTION OF THE PREFERRED EMBODIMENTS

Figure 4:
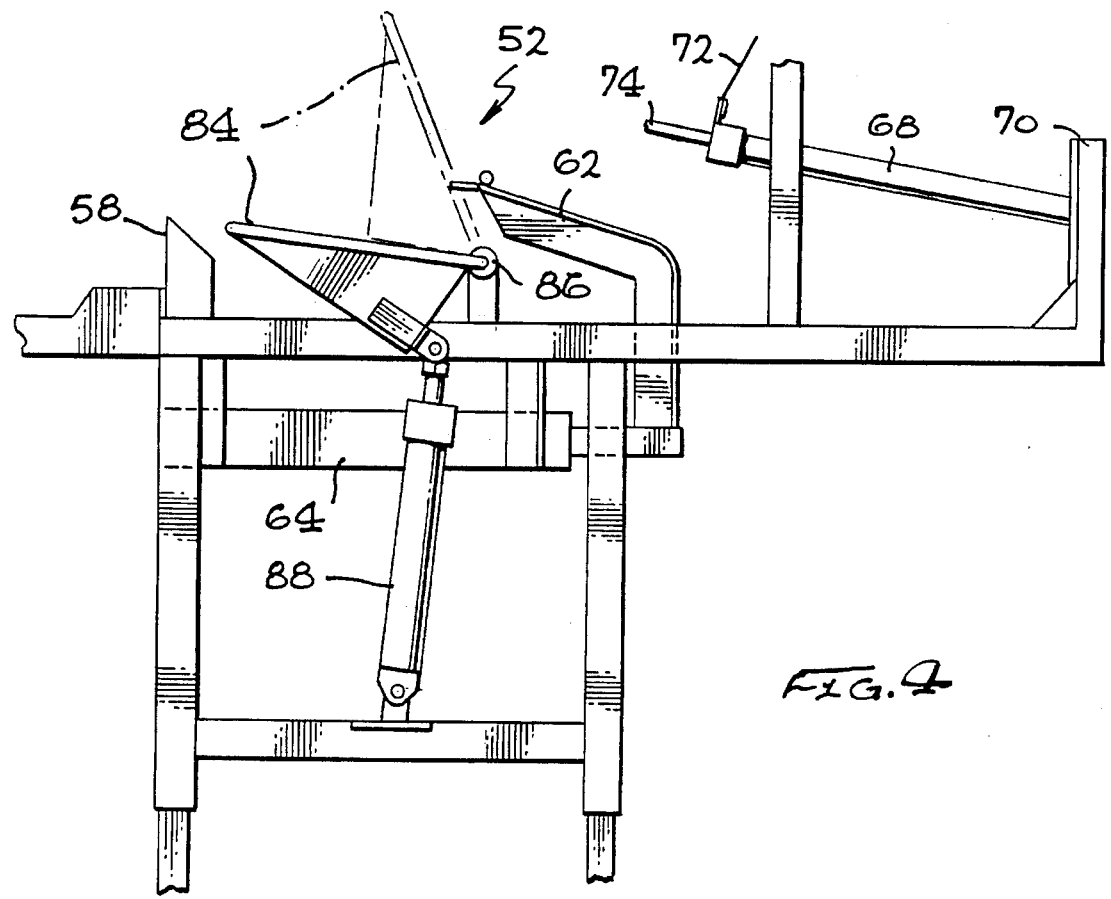
FIG. 4 is a side-elevational view of the portion of the processing apparatus directed to chiseling and jaw removal, as seen generally along line 4—4 or FIG. 2.

The meat packing industry separates the animal carcass into various portions for different uses. The present invention is related to working on the animal head for separating some of the parts thereof. FIG. 1 indicates a process step 10 at which the animal head is removed from the carcass for further processing. This step is accomplished prior to utilization of the apparatus of this invention. The head is delivered to the apparatus of this invention and is placed on the spinner, as indicated by the process step 12 in FIG. 1.

FIG. 2 shows a Y-shaped table top 14 supported on legs 16 at an appropriate height for convenient working. The table is part of the apparatus 18 of this invention. The head is delivered to the apparatus 18 from the near left in FIG. 2 and is delivered to the spinner station 20, which is seen in FIGS. 2 and 3. Platform 22 is movable up and down beneath the table 14. The platform 22 remains parallel to the table top by means of parallelogram linkage comprised of links 24 and 26. The links are pivoted to each other, and each of the links is pivoted at one end and sliding relationship at the other end to table frame 28 and platform 22. Fluid cylinder 30 is connected to the table frame and platform so that fluid delivered thereto raises and lowers the platform 22 with respect to the table frame and with respect to the table top. Post 32 is mounted on platform 22 and extends upward through a slot in the table top, as seen in FIG. 2. The upper end of the post carries nose cup 34, which is rotatable on the post 32.

Guide 36 slides in guideway 38, which is fixed on platform 22. Post 42 is mounted on guide 36 and extends upwardly through a slot in the table top, as seen in FIG. 2. A plurality of crown pins 44 are mounted together and are rotatably mounted in the top of the post 44. Fluid cylinder 46 is mounted between posts 32 and 42 so that delivering fluid to the cylinder can move the post 42 toward and away from the post 32.

The head is delivered to the table top 14. With the platform 22 in the lowered position, the nose of the head 48 is placed in nose cup 34 by sliding the head into the nose cup 34. In the lowered position, the nose cup is at an appropriate height to receive the nose without lifting the head or any portion thereof. Fluid is then controlled to the cylinder 46 to thrust the crown pins 44 into the back of the skull to hold the head between the crown pins and the nose cup. Next, fluid is delivered to cylinder 30 so that the head is raised above the table top. The worker at this position can rotate the head on the axis between the rotatable devices engaging the head and can make the temple cuts while turning the head on its support axis. When the temple cuts are made, the cylinders are reversed and the head is returned to the table top where it is released and slid to the next station. The spinner station 20 is ready to receive another head, which it engages and raises for work thereon.

The templing operation at the spinner station is about twice as fast as that of the chiseling station. Thus, there are two chiseling stations 50 and 52 on the Y-shaped table, as illustrated in FIG. 2. These are identical, except they are in left and right hand organization. Only the chiseling station 52 will be described in detail. Two head-processing steps are accomplished at the chiseling station. The first is the chiseling step indicated in box 54 in the process organization shown in FIG. 1. The second is the jaw separation step illustrated by the process box 56 in FIG. 1. Both of these steps are accomplished at the same station, but are successively accomplished with some of the same process apparatus.

Figure 5:
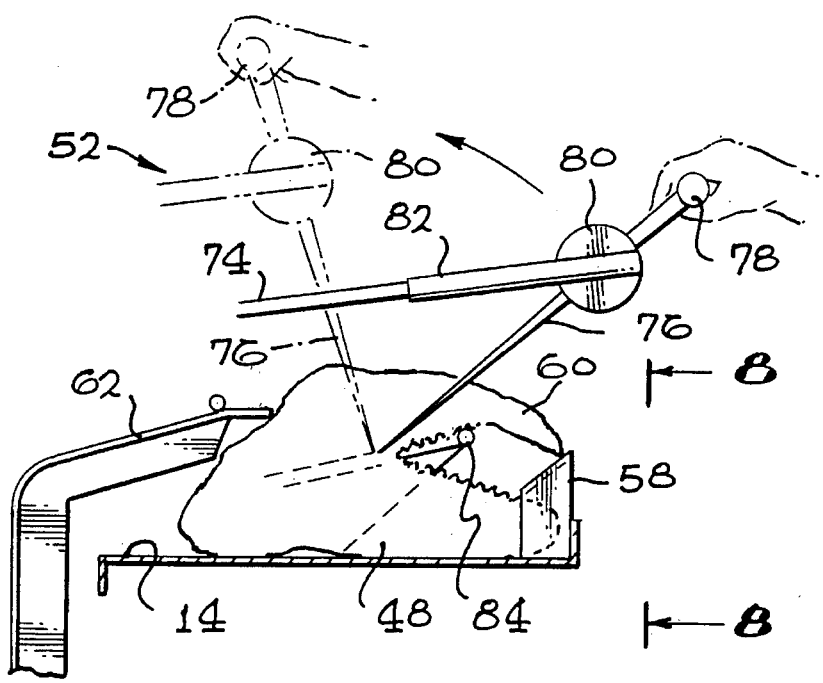
FIG. 5 is an enlarged side-elevational view showing the position of a head restrained at the chiseling and jaw removal station, as seen generally along line 5—5 of FIG. 2.
Figure 8:
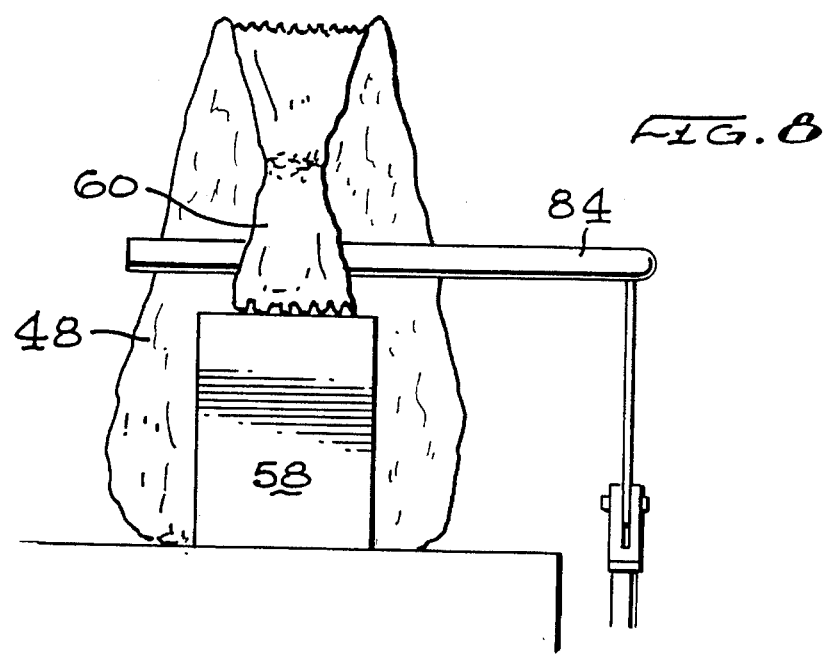
FIG. 8 is an elevational view, as seen generally along line 8—8 of FIG. 5.

The station 52 is shown from the worker's side in FIG. 4 and is shown in the left or opposite side in FIG. 5. The same table 14 extends to the station 52. A nose cup 58 is positioned on the table. The nose cup receives the nose of the head 48, while the jaw 60 lies on top of the nose cup, as is seen in FIGS. 5 and 8. Head holder 62 is an arm which reaches up to engage the head to force it into nose cup 58, as seen in FIG. 5. The head holder 62 is carried on the piston rod of fluid cylinder 64, which is mounted under the table, as seen in FIG. 4. With the cylinder 64 supplied with fluid under pressure, the head is retained in position during the chiseling operation.

Chiseling is accomplished by means of the chisel generally indicated at 66 in FIG. 2. The chisel assembly starts with a fluid cylinder 68, which is universally mounted on frame 70, which is mounted above the table 14. Fluid cylinder 68 has its weight substantially supported by counter balance 72. The counter balance is in the form of a cable attached to the free end of the cylinder which is spring-wound back into the counter balance structure. Piston rod 74 extends out of cylinder 68. Chisel 76, see FIG. 5, is a pointed chisel which is mounted on the pivot disc 80 which is pivoted on sleeve 82, which is mounted on piston rod 74. Handle 78 is suitable for manual grasp by the hand of the worker, as seen in FIG. 5. The handle 78 is pivotally mounted on disc 80 separately from the chisel. Fluid valves are actuated by movement of the handle 78 with respect to the disc 80. The valves cooperate with the piston rod to control the flow of fluid under pressure to the two ends of the cylinder. When the handle 78 is pulled toward the operator, the valving extends the piston rod so as to act as power assist for the placement of the chisel. The point of the chisel is placed in the head adjacent the jaw pivot joint, as is seen in FIG. 5. The operator thrusts the handle away from himself so as to pivot the chisel about its point, and this pries the meat away from the bone. This is repeated four times on each head, once on each side on the outside and once on each side at the inside through the open bottom of the jawbone. This loosens the meat for ease of further removal.

Figure 6:
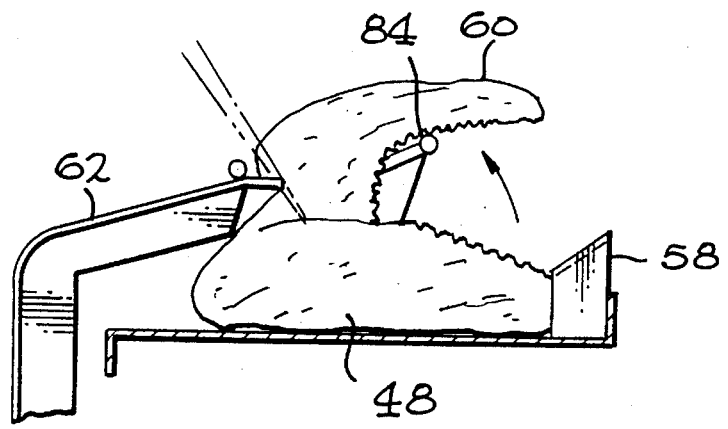
FIG. 6 is a view similar to FIG. 5 at the beginning of the jaw removal step.
Figure 7:
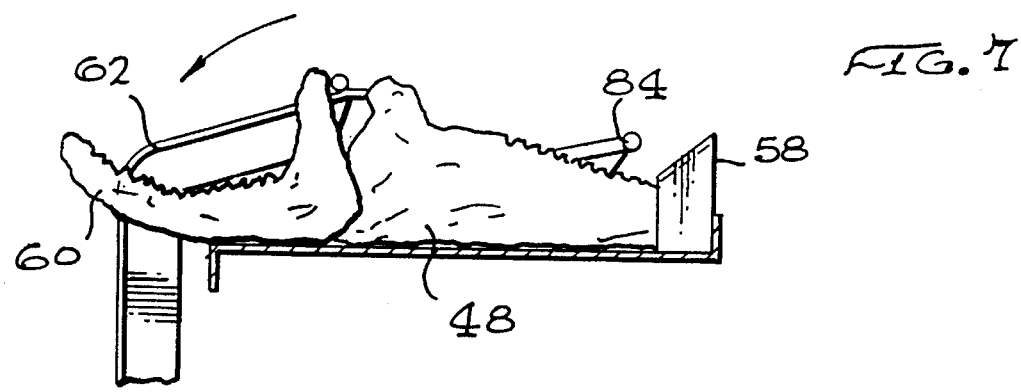
FIG. 7 is a view similar to FIG. 6 at the completion of the jaw removal step.

Another step accomplished at the same station is the removal of the jaw. Jaw removal bar 84 is positioned close to the nose cup 58, as seen in FIGS. 2, 4 and 5. It is positioned so that the jaw removal bar is between the teeth of the head when the head is initially put in position, as seen in FIG. 5. The jaw removal bar is L-shaped, as seen in FIG. 2, and is pivoted in pivot post 86, which is seen in FIGS. 2 and 4. Fluid cylinder 88 is connected to the table frame and to the jaw removal bar. When in the rest position, the bar is close to the nose cup 58, as seen in FIG. 5. When the fluid cylinder is actuated, the jaw removal bar swings up, as is progressively shown in FIGS. 6 and 4, to break loose the jaw 60 to the position shown in FIG. 7. That completes the processing at station 52. The head holder 62 is released. The head and jaw are passed onto the next processing station, such as by down slide 90.

Figure 9:
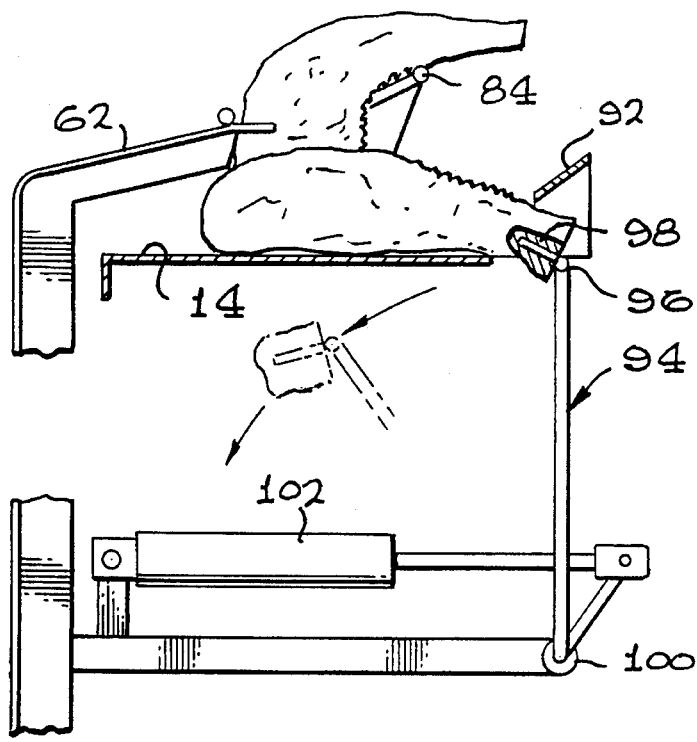
FIG. 9 is a view similar to FIG. 6, but showing a second preferred embodiment of the animal head processing apparatus wherein the apparatus includes a snout-removing device and is particularly useful with hog heads
Figure 11:
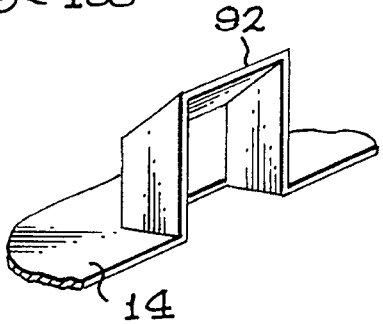
FIG. 11 is a perspective view of the hog snout holder seen in FIGS. 9 and 10.
Figure 10:
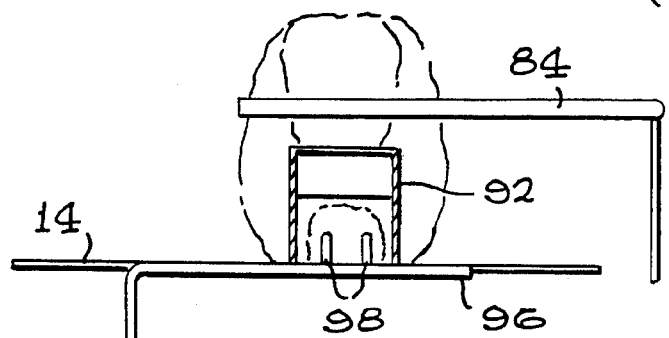
FIG. 10 is an elevational view as seen from the right of FIG. 9.

The processing thus described is suitable for cattle. In addition to those steps, the processing of hog heads also requires the removal of the snout. FIGS. 9, 10 and 11 show the table 14, nose cup 92, head holder 62 and jaw removal bar 84 in similar configuration to the structure for beef heads. The nose cup 92 is of slightly different configuration and is open on the bottom. Snout remover 94 has an upper bar 96 which carries a pair of snout pins 98. These pins are engaged in the snout when the head is put in place and held in place by head holder 62. Bar 96 is pivotably mounted on pivot bearings 100. Fluid cylinder 102 moves the upper bar 96 from its rest position shown in full lines in FIG. 9 to pull away the snout as it moves to the dashed line shown in FIG. 9. As far as sequencing is concerned, the jaw is first removed so that the head is stabilized during the removal of the jaw by rotation of the jaw removal bar 84. After the jaw removal, then the snout remover 94 is actuated from the full line to the dashed line position of FIG. 9. Automatic reversal of the cylinder 102 throws the detached snout from the snout pins. Thereupon, the head is released. In this way, animal head processing is accomplished with minimal physical effort and minimal repetitive effort to reduce repetitive stress injury and other similar problems.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An animal head processing apparatus comprising:

a table along which a detached animal head may be moved for processing;

a nose cup, means for rotatably mounting said nose cup;

crown engagement means, means for rotatably mounting said crown engagement means;

means for moving said crown engagement means toward and away from said nose cup so that an animal head can be engaged therebetween;

a platform, both said nose cup and said crown engagement means being mounted on said platform, said platform being movably mounted with respect to said table so that said platform can be moved up and down with respect to said table and said nose cup and said crown engagement means can be moved up and down from a position adjacent said table where an animal head can be engaged between said nose cup and said crown engagement means while resting on said table to a position above said table where said rotatable nose cup and said rotatable crown engagement means support the animal head above said table for rotatable positioning of said head free of said table for acting thereon.

2. The animal head processing apparatus of claim 1 wherein said nose cup and said crown engagement means are respectively mounted on first and second posts, said first and second posts being movable with respect to each other for engaging an animal head between said crown engagement means and said nose cup.

3. The animal head processing apparatus of claim 2 wherein there is a motor connected between said first and second posts to move said first and second posts and said nose cup and head engagement means toward and away from each other.

4. The animal head processing apparatus of claim 3 wherein said motor is a fluid cylinder.

5. The animal head processing apparatus of claim 2 wherein said head engagement means comprises at least one rotatably mounted crown pin.

6. The animal head processing apparatus of claim 1 wherein said platform is movably mounted beneath said table, said platform carrying said nose cup and said head engagement means thereon above said table for moving said nose cup and said head engagement means with respect to said table.

7. The animal head processing apparatus of claim 6 wherein said platform is mounted below said table and there are slots in said table, said nose cup and said head engagement means being respectively mounted on first and second posts, said first and second posts being mounted on said platform and extending upward through said slots in said table.

8. The animal head processing apparatus of claim 7 wherein there is a fluid motor to move said posts with respect to each other and there is a second fluid motor to move said platform with respect to said table so that operator control of said fluid motors controls the grasp on the animal head and the raising of the animal head above the table.

9. The animal head processing apparatus of claim 8 wherein there is also on said table an animal head retention apparatus for retaining a detached animal head therein during chiseling and jaw separation.

10. The animal head processing apparatus of claim 1 wherein there is also on said table an animal head retention apparatus for retaining a detached animal head therein during chiseling and jaw separation.

11. An animal head processing apparatus comprising:

a table for the movement therealong of detached animal heads, a nose cup on said table;

a head holder on said table, said head holder being movable with respect to said nose cup so that a detached animal head can be retained therebetween in jaw-up position, a motor connected to said head holder, said motor urging said head holder toward said nose cup;

a chisel assembly including a chisel mounted adjacent to said head holder so that said chisel assembly can be manipulated to separate meat from bone in a head held in jaw-up position between said nose cup and said head holder; and a jaw removal bar, said jaw removal bar being movably mounted with respect to said table, a motor connected to said jaw removal bar, said jaw removal bar having a first, inactive position adjacent said nose cup at which said arm extends through the mouth of an animal head retained between said nose cup and said head holder, said jaw removal bar being movable by said jaw removal bar motor to a second position which removes the jaw from the animal head.

12. The animal head processing apparatus of claim 11 wherein said chisel assembly comprises a fluid cylinder having one end movably mounted with respect to said table and having a piston rod extending out of its other end and a chisel mounted on said piston.

13. The animal head processing apparatus of claim 12 wherein there is a manual handle on said chisel, said manual handle being connected to a valve which controls fluid flow to said cylinder so that manipulation of said handle and said chisel causes following motion of said piston to provide power assist movement of said chisel.

14. The animal head processing apparatus of claim 13 wherein a fluid cylinder is connected between said head holder and said nose cup to move said head holder with respect to said nose cup.

15. The animal head processing apparatus of claim 13 further including a snout remover, said snout remover having snout-engaging pins thereon, said snout-engaging pins being movably mounted and being connected to a fluid motor so that said snout-engaging pins move from a first position wherein they lie adjacent said nose cup to a second position wherein the snout is removed.

16. The animal head processing apparatus of claim 11 wherein said jaw removal arm is pivoted on said table away from said nose cup and said motor is a fluid motor is connected to move said arm and said jaw removal bar from its first position to a second position wherein the jaw is detached.

17. An animal head processing apparatus comprising:

a table, a nose cup and a head holder on said table, said nose cup and said head holder being positioned above said table, said nose cup and said bead holder being movable with respect to each other, a head holder motor being connected between said nose cup and said head holder to move said head holder toward said nose cup so as to retain a detached animal head therebetween in jaw-up position; and a jaw removal bar movably mounted on said table, said jaw removal bar being positioned adjacent said nose cup so that, when said arm is in a first position, said arm extends through the jaw of an animal head lying jaw-up and retained between said nose cup and said head holder;

a jaw removal arm motor connected to said jaw removal bar to swing said jaw removal bar to remove the jaw from the animal head; and a chisel assembly mounted on said table adjacent said head holder, said chisel assembly having a chisel thereon and a chisel motor connected to said chisel to move said chisel.

18. The animal head processing apparatus of claim 17 further including a snout remover, said snout remover having snout-engaging pins thereon, said snout-engaging pins being movably mounted and being connected to a fluid motor so that said snout-engaging pins move from a first position wherein they lie adjacent said nose cup to a second position wherein the snout is removed.

19. An animal head processing apparatus comprising:

a table, a nose cup and a head holder on said table, said nose cup and said head holder being positioned above said table and being movable with respect to each other so as to retain a detached animal head therebetween in jaw-up position;

a jaw removal bar movably mounted on said table, said jaw removal bar being positioned adjacent said nose cup so that, when said bar is in a first position, said bar extends through the jaw of an animal head lying jaw-up and retained between said nose cup and said head holder;

a fluid motor connected to said jaw removal bar to swing said jaw removal bar to remove the jaw from the animal head;

a chisel assembly mounted on said table adjacent said head holder, said chisel assembly having a chisel thereon and a chisel motor connected to said chisel to move said chisel;

a snout remover, said snout remover having snout-engaging pins thereon, said snout-engaging pins being movably mounted and being connected to a fluid motor so that said snout-engaging pins move from a first position wherein they lie adjacent said nose cup to a second position wherein the snout is removed.

20. An animal head processing apparatus comprising:

a table for the movement therealong of detached animal heads, a nose cup on said table;

a head holder on said table, said head holder being movable with respect to said nose cup so that a detached animal head can be retained therebetween in jaw-up position;

a chisel assembly mounted adjacent to said head holder so that said chisel assembly can be manipulated to separate meat from bone in a head held in jaw-up position between said nose cup and said head holder, said chisel assembly comprising a fluid cylinder having one end movably mounted with respect to said table and having a piston rod extending out of its other end and a chisel mounted on said piston, a manual handle on said chisel, said manual handle being connected to a valve which controls fluid flow to said cylinder so that manipulation of said handle and said chisel causes following motion of said piston to provide power assist movement of said chisel;

a jaw removal bar, said jaw removal bar being movably mounted with respect to said table, said jaw removal bar being positioned in its first, inactive position adjacent said nose cup so that said bar extends through the mouth of an animal head retained between said nose cup and said head holder, said jaw removal bar being movable to a second position which removes the jaw from the animal head; and a snout remover, said snout remover having snout-engaging pins thereon, said snout-engaging pins being movably mounted and being connected to a fluid motor so that said snout-engaging pins move from a first position wherein they lie adjacent said nose cup to a second position wherein the snout is removed.

* * * * *